United States Patent [19]

Buethe et al.

[11] 4,287,039

[45] Sep. 1, 1981

[54] RADIATION-CURABLE AQUEOUS BINDER DISPERSIONS, THEIR PREPARATION AND THEIR USE

[75] Inventors: Ingolf Buethe, Mannheim; Werner Loch, Ludwigshafen, both of Fed. Rep. of Germany

[73] Assignee: BASF Aktiengesellschaft, Fed. Rep. of Germany

[21] Appl. No.: 97,747

[22] Filed: Nov. 26, 1979

[30] Foreign Application Priority Data

Dec. 14, 1978 [DE] Fed. Rep. of Germany ....... 2853921

[51] Int. Cl.$^3$ .............................................. C08L 67/06
[52] U.S. Cl. ........................... 204/159.19; 204/159.14; 204/159.22; 260/29.6 NR
[58] Field of Search ................. 260/29.2 E, 29.2 EP, 260/29.2 UA, 29.6 NR, 29.6 RW; 204/159.14, 159.15, 159.16, 159.19, 159.22; 526/201

[56] References Cited

U.S. PATENT DOCUMENTS

| | | | |
|---|---|---|---|
| 2,890,199 | 6/1959 | McNulty | 526/201 |
| 3,759,873 | 9/1973 | Hudak | 204/159.19 |
| 4,033,920 | 7/1977 | Isozaki | 260/29.6 H |
| 4,073,777 | 2/1978 | O'Neill | 204/159.19 |
| 4,101,493 | 7/1978 | Nakagawa | 204/159.19 |
| 4,105,518 | 8/1978 | McGinniss | 204/159.19 |
| 4,116,787 | 9/1978 | Gatechair | 204/159.23 |
| 4,125,503 | 11/1978 | McCarty | 204/159.16 |
| 4,130,469 | 12/1978 | McGinniss | 204/159.19 |
| 4,133,909 | 1/1979 | Spencer | 204/159.19 |

FOREIGN PATENT DOCUMENTS

| | | |
|---|---|---|
| 709564 | of 0000 | Belgium . |
| 709565 | of 0000 | Belgium . |
| 2650782 | of 0000 | Fed. Rep. of Germany . |
| 2724087 | of 0000 | Fed. Rep. of Germany . |
| 6714979 | of 0000 | Netherlands . |
| 7507052 | of 0000 | Netherlands . |
| 1182073 | of 0000 | United Kingdom . |
| 1193412 | of 0000 | United Kingdom . |

*Primary Examiner*—Paul R. Michl
*Attorney, Agent, or Firm*—Keil & Witherspoon

[57] ABSTRACT

A radiation-curable aqueous binder dispersion which comprises water and, dispersed therein, one or more prepolymers which contain from 0.01 to 1.0 mole of polymerizable carbon-carbon double bonds per 100 g of prepolymer and have a mean molecular weight of not less than 350 and a viscosity at 23° C. of not less than 600 cp, as well as from 0.1 to 30 percent by weight, based on prepolymer, of one or more dispersants and from 0 to 20 percent by weight, based on prepolymer, of one or more photoinitiators.

The binder dispersions according to the invention may be used as surface coatings for non-metallic and metallic substrates, and for bonding fiber webs.

7 Claims, No Drawings

RADIATION-CURABLE AQUEOUS BINDER DISPERSIONS, THEIR PREPARATION AND THEIR USE

The present invention relates to radiation-curable aqueous binder dispersions, their preparation and their use as surface coatings and for bonding fiber webs.

Aqueous systems which may be used as surface coatings without polluting the environment are well known. Because of the ever more stringent controls on the emission of pollutants, and because of the constantly rising prices of solvents, the use of such surface coatings is arousing increasing interest. However, conventional water-based finishes have the disadvantage that even coatings from 30 μm upwards show surface flaws due to evaporation pitting. A further increase in coating thickness, by only a few micrometers, can only be achieved by using complicated heating programs or by adding substantial amounts (20 percent by weight, or more) of co-solvents. The first approach is very time-consuming and cost-intensive, whilst the latter once again implies pollution of the environment.

Netherlands Pat. No. 7,507,052 describes anionic aqueous emulsions prepared from radiation-curable surface-coating binders by neutralizing the carboxyl groups with alkali metal hydroxide solutions, ammonia or amines. However, alkali metal ions remain in the final surface-coating film and reduce its water resistance; ammonia or amines may partially volatilize on preheating and also cause pollution of the environment; finally, amine remaining in the surface-coating film reduces the water resistance and causes yellowing. In addition, the poly-salt molecules exhibit substantial mutual interaction, causing a thickening effect. Accordingly, the viscosity is increased or, at a given viscosity, the solids content is reduced. This latter shortcoming is encountered to an even greater degree in cationic aqueous dispersions such as are described in Germain Laid-Open Applications DOS No. 2,650,782 and DOS No. 2,724,087.

Netherlands Pat. No. 6,714,979 and Belgian Pat. Nos. 709,564 and 709,565 disclose radiation-curable aqueous emulsion polymers. However, the emulsion polymers are restricted to addition polymers, for example polyacrylates, and to ensure solubility in water it is even necessary to rule out the use of certain monomers a priori; furthermore, as is well-known, emulsion polymers have very high molecular weights, which has an adverse effect on leveling and on the achievable coating thickness.

It is an object of the present invention to provide aqueous binders, free from volatile constituents, which can be prepared and used in an advantageous manner and which can be cured, on a variety of substrates, to give very thick coatings which are free from pitting, possess very high gloss, are water-resistant and are free from flaws.

It is a further object of the present invention to provide aqueous coating agents having a high solids content.

We have found that these objects are achieved by radiation-curable aqueous binder dispersions which essentially comprise (A) from 20 to 80 percent by weight of water,
(B) from 80 to 20 percent by weight of one or more prepolymers which are dispersed in (A) and contain from 0.01 to 1.0 mole, per 100 g of prepolymer, of polymerizable carbon-carbon double bonds and have a mean molecular weight of not less than 350 and a viscosity, at 23° C., of not less than 600 cp, the sum of the percentages of (A) and (B) being 100, together with (C) from 0.1 to 30 percent by weight, based on (B), of one or more dispersants and (D) from 0 to 20 percent by weight, based on (B), of one or more photoinitiators.

Preferred components (B) are polyesters which contain polymerizable carbon-carbon double bonds and have an acid number of at most 10, polyethers which contain polymerizable carbon-carbon double bonds, hydroxyl-containing reaction products of a polyepoxide, containing two or more epoxide groups per molecule, with one or more $\alpha,\beta$-ethylenically unsaturated carboxylic acids, polyurethane acrylates and methacrylates, and acrylic copolymers containing $\alpha,\beta$-ethylenically unsaturated acyl radicals.

The present invention further relates to a process for the preparation of these radiation-curable aqueous binder dispersions wherein a solution of component (B) in an inert organic solvent or solvent mixture is mixed with an aqueous solution of component (C) and the inert organic solvent or solvent mixture is removed by distillation. Component (D) and other assistants and adjuvants may be added to the solution of component (B), to the mixture of the latter with the aqueous solution of component (C) or to the mixture which remains after removing the inert organic solvent or solvent mixture by distillation. The present invention yet further relates to the use of the radiation-curable aqueous binder dispersions according to the invention for surface coatings, curable by means of UV radiation or of accelerated electron beams, for use on metallic and non-metallic substrates, which surface coatings may additionally contain synergistic agents for component (D), pigments, fillers, soluble dyes, other binders, differing from component (B), and other assistants conventionally used in surface-coating technology, and to the use of the dispersions for the bonding of fiber webs, curing of the binder again being effected by UV radiation or accelerated electron beams.

The novel radiation-curable non-ionic aqueous binder dispersions provide a very advantageous method of achieving the object of the invention.

The novel radiation-curable aqueous binder dispersions are virtually free from volatile constituents, such as monomers or co-solvents, which pollute the environment. They may be used to produce coatings on a variety of substrates, and the coatings can be cured by means of UV radiation or electron beams to produce finishes, having a thickness of 100 μm or more, which are free from pitting, have a high gloss, are water-resistant and are free from flaws. Crosslinking is carried out after the water has evaporated completely or, if the coating is applied by spraying, after the trapped air has also completely escaped.

The following may be noted in respect of the individual components of the radiation-curable aqueous binder dispersions according to the invention:

(A) Component (A) is water present in a concentration of from 20 to 80, preferably from 30 to 60, percent by weight.

(B) Component (B) is a film-forming prepolymer or prepolymer mixture which is dispersed, or in special cases dissolved, in water, and which contains from 0.01 to 1.0, preferably from 0.04 to 0.6, mole of polymerizable double bonds per 100 g of substance, and has a mean molecular weight of not less than 350, preferably not less than 600, and a viscosity (according to DIN draft 53,788), at 23° C., of not less than 600, preferably 1,000 cp. This prepolymer may be, for example:

1. A polyester which has an acid number of at most 10 and is derived from aliphatic and/or aromatic dicarboxylic acids, eg. succinic acid, glutaric acid, adipic acid, pimelic acid, suberic acid, azelaic acid, sebacic acid, cyclohexanedicarboxylic acid, phthalic acid, isophthalic acid, terephthalic acid, maleic acid, fumaric acid, itaconic acid or their derivatives and from polyhydric alcohols, eg. ethylene glycol, polyethylene glycols, propylene glycol, polypropylene glycols, butanediol, hexanediol, neopentyl glycol, hydroxypivalic acid, neopentyl glycol ester, trimethylolpropane, glycerol, pentaerythritol and/or tris-hydroxyethyl isocyanurate, as well as from $\alpha,\beta$-ethylenically unsaturated monocarboxylic acids, eg. acrylic acid, methacrylic acid, crotonic acid or cinnamic acid and/or dicarboxylic acid half-esters of monoalkanols, eg. maleic, fumaric and itaconic acid half-esters of $C_1$-$C_4$-monoalcohols, acrylic acid and methacrylic acid being preferred, the said polyester being obtainable by the conventional methods, in a single stage or stepwise, 2. an aliphatic or araliphatic polyether which is obtained by reacting a dihydric and/or polyhydric alcohol, including those mentioned under (1) with various amounts of ethylene oxide and/or propylene oxide, and the free hydroxyl groups of which are completely or partially etherified with an ethylenically unsaturated alcohol, eg. allyl alcohol, methallyl alcohol, crotyl alcohol or cinnamyl alcohol and/or esterified with an $\alpha,\beta$-ethylenically unsaturated monocarboxylic acid such as one of those mentioned under (1), 3. an unsaturated hydroxyl-containing compound which may be prepared by reacting a polyepoxide, having an average of 2 or more epoxide groups per molecule, for example a polyglycidyl ether of a polyhydric alcohol, including those mentioned under (1), a polyglycidyl ether of a polyhydric phenol, eg. bisphenol A, a glycidyl ester of a polybasic carboxylic acid, including those mentioned under (1), other glycidyl compounds, eg. triglycidyl isocyanurate, and/or an epoxidized natural or synthetic oil, with an $\alpha,\beta$-ethylenically unsaturated carboxylic acid, including those mentioned under (1), 4. a polyurethane, which may or may not contain urea groups, and which can be prepared from an aliphatic and/or aromatic polyisocyanate, eg. tetramethylene diisocyanate, hexamethylene diisocyanate, isophorone diisocyanate, diphenylmethane diisocyanate, toluylene diisocyanate, naphthylene diisocyanate, 4,4'-diphenyl ether diisocyanate, dimers or trimers which may be based on these, or a reaction product of the above with minor amounts of a hydrogen-active compound, eg. a polyhydric alcohol, including those mentioned under (1), a polyfunctional amine and/or an amino-alcohol, by reaction with a hydroxyl-containing ester of acrylic acid or methacrylic acid, eg. hydroxyethyl acrylate or methacrylate, hydroxypropyl acrylate or methacrylate and/or butanediol monoacrylate or monomethacrylate, or 5. a polymer which may be obtained by introducing $\alpha,\beta$-ethylenically unsaturated acyl radicals, derived, for example, from the $\alpha,\beta$-ethylenically unsaturated monocarboxylic acids mentioned under (1), into an acrylate copolymer, styrene/acrylate copolymer or the like which has been prepared by conventional solution polymerization and contains not less than 0.02 mole of hydroxyl, and/or epoxy groups per 100 g of substance, or by introducing glycidylesters of $\alpha,\beta$-ethylenically unsaturated carboxylic acids mentioned under (1) into copolymers containing, beside other functional groups, not less than 0.02 mole of carboxyl groups per 100 g of substance.

Mixtures of the prepolymers mentioned under (1) to (5) may also be used. The amount of component (B) present in the aqueous binder dispersions according to the invention is from 80 to 20, preferably from 70 to 40, percent by weight.

(C) Component (C) is a conventional dispersant which is present in the radiation-curable aqueous surface-coating dispersion, according to the invention, in an amount of from 0.1 to 30, preferably from 3 to 12, percent by weight, based on (B). Preferably, it is a water-soluble high molecular weight organic compound containing polar groups, eg. polyvinylpyrrolidone, a copolymer of vinyl propionate or vinyl acetate with vinylpyrrolidone, a partially hydrolyzed copolymer of an acrylic ester and acrylonitrile, a polyvinyl alcohol, which may have a variety of residual acetate contents, a cellulose ether, gelatin or a mixture of the above. Particularly preferred protective colloids are a polyvinyl alcohol having a residual acetate content of less than 35, especially from 5 to 30, mole percent and/or a vinylpyrrolidone/vinyl propionate copolymer having a vinyl ester content of less than 35, especially from 5 to 30, percent by weight.

In addition, non-ionic and, in special cases, ionic emulsifiers may also be used. Preferred emulsifiers are relatively long-chain alcohols or phenols oxyethylated and/or oxypropylated to various degrees (ie. adducts of from 4 to 50 moles of ethylene oxide and/or propylene oxide). The use of a combination of the above protective colloids with the above emulsifiers is particularly advantageous, since it results in finer dispersions.

(D) Component (D) is a photoinitiator conventionally used in radiation-curable surface coatings, eg. benzophenone, benzil dimethylketal, benzoin ethers, other aromatic ketones, anthraquinone, thioxanthone or a derivative of these, and is present in the radiation curable aqueous surface-coating dispersions according to the invention in an amount of from 0 to 20, preferably from 0 to 10, percent by weight, based on (B).

If the binders according to the invention are to be cured by UV radiation, the synergistic agents for component (D) which are conventionally used in radiation-curable surface coatings may also be present. Their amount in the radiation-curable aqueous binder dispersions according to the invention may be up to 10 percent by weight, preferably up to 5 percent by weight, based on (B). Examples of preferred synergistic agents are methyldiethanolamine and triethanolamine.

If desired, pigments and/or fillers conventionally used in surface coatings may also be added to the binder dispersions according to the invention, in amounts of up to 100 percent by weight, based on the sum of components (B) and (C); amongst these additives, rutile, carbon black, talc, zinc oxide, calcium carbonate, various iron oxides and organic pigments are preferred. Furthermore, other assistants conventionally used in surface coating technology, eg. leveling agents, wetting agents, anti-foam agents, soluble dyes, neutralizing agents, and other binders, not mentioned under (B), eg. aminoplast resins (in minor amounts based on (B)) may be present in the curable aqueous binder dispersions according to the invention.

To prepare the radiation-curable aqueous surface-coating dispersions according to the invention, the component (B) is dissolved in an inert organic solvent or solvent mixture. Alternatively, the solution obtained from the synthesis of (B) may be used direct. Examples of suitable solvents are tetrahydrofuran, dioxane, acetone, methyl ethyl ketone, propanols, butanols, ethyl acetate, butyl acetate, methylene chloride, xylenes or toluene; methyl ethyl ketone, tetrahydrofuran, isopropanol and isobutanol are preferred.

An aqueous solution of the dispersant (C) is then added to this solution, to which component (D) and a synergistic agent for component (D) may already have been added. The organic solvent is removed from the resulting mixture by distillation, in general as an azeotropic mixture with water, under atmospheric or reduced pressure, whilst stirring the mixture vigorously. The resulting aqueous dispersion has a solids content of from 20 to 80 percent by weight. Its residual solvent content is less than 0.1 percent by weight, based on the total amount of the aqueous binder dispersion.

In special cases, the 100% strength prepolymers, which may already contain component (D) and a synergistic agent, may be directly incorporated into water, containing the dispersant (C), by vigorous stirring.

The component (D) which may or may not be used, and the assistants, may of course also be subsequently incorporated into the finished dispersion, using the methods conventionally employed in surface-coating technology.

The finished surface coatings may be diluted with water, which may or may not contain additional dispersant (C), in order to bring them to the optimum processing viscosity.

The radiation-curable aqueous surface coating dispersions according to the invention have a long shelf life. They are virtually free from volatile constituents which pollute the environment, and can be very successfully employed as surface coatings on non-metallic and metallic substrates, eg. leather, plastics, paper, wood, glass, ceramic and metals, though non-metallic substrates are preferred. Using the radiation-curable aqueous binder dispersions according to the invention, water-resistant coatings which have a high gloss and are free from pitting can be obtained, in thicknesses of over 100 $\mu$m, by a single application.

The binder dispersions according to the invention can also be used advantageously for the bonding of fiber webs.

The radiation-curable aqueous surface coatings according to the invention are applied by conventional methods, eg. brushing, knife coating, spraying, roller coating, casting or printing. They are cured by, in general, preheating the coating for up to 30 minutes at up to 100° C. and then briefly exposing it to UV radiation or to a high energy electron beam. For this purpose, the UV radiation sources or electron beam sources conventionally used for the curing of coatings are employed. In order to minimize the preheat time, relatively low molecular weight prepolymers are preferred for viscosity reasons.

In the case of porous substrates, eg. leather, paper and wood, only very short preheat times are needed, since the greater part of the water is absorbed by the substrate; at times, preheating can be omitted entirely.

Compared to conventional radiation-curable surface coatings, those according to the invention inter alia also have the advantage that they do not require a reactive diluent (monomer).

The resulting very glossy thick coatings are free from surface flaws and resistant to water and organic solvents, and exhibit considerable flexibility, scratch resistance and wrinkle resistance. As is found when the compositions are employed as clear finishes, the coatings obtained are absolutely free from clouding.

Further advantages of the radiation-curable aqueous binder dispersions according to the invention are their low toxicity, their non-pollution of the environment and their great economy. The latter factor applies particularly in comparison with conventional water-based finishes which, even to achieve non-pitted coatings of only 60 $\mu$m, require complicated, time-consuming heating programs, high baking temperatures (in some cases up to 200° C.) and long curing times (on occasion exceeding 30 minutes). For this reason, conventional water-based finishes can in any case not be used on non-metallic organic substrates, eg. leather, paper or wood. On the other hand, these substrates prove to be particularly advantageous for the radiation-curable aqueous surface coatings according to the invention. However, metallic substrates can also be coated very successfully with the dispersions according to the invention. In this category, the dispersions are employed especially for coil-coating, because of the evenness of the substrates, the short preheat times, especially in the case of thin coatings, and the short curing time. In contrast to conventional radiation-curable finishes which, because of their monomer content, may be toxicologically unsafe, the radiation-curable aqueous surface coatings according to the invention can even conceivably be used for coating foodstuff containers.

The Examples which follow illustrate the invention without implying any limitation thereof. Parts and percentages are by weight, unless stated otherwise.

PREPOLYMER 1

320 parts of a polyester (obtained from adipic acid and neopentyl glycol and having an OH number of 210), 200 parts of isophorone diisocyanate and 0.4 part of dibutyl-tin dilaurate are heated at 70° C. After 2.5 hours, 69.5 parts of 2-hydroxyethyl acrylate are added and the mixture is stirred at 70° C. until all the isocyanate groups have reacted. The reaction product solidifies on cooling to room temperature.

PREPOLYMER 2

345 parts of a polyester (obtained from adipic acid, phthalic acid, trimethylolpropane and ethylene glycol and having an OH number of 325), 250 parts of cyclohexane, 1.5 parts of concentrated sulfuric acid, 1.0 part of hydroquinone and 163 parts of acrylic acid are boiled and the water of reaction is removed azeotropically. After about 8 hours, the residual cyclohexane and the excess acrylic acid are stripped off by distillation under reduced pressure. A viscous resin having an acid number of 7 is obtained; this is used without any additional working up.

EXAMPLE 1

(a) Preparation of the dispersion:

3 parts of benzil dimethylketal and 6 parts of benzophenone are added to 400 parts of a 75% strength solution of prepolymer 1 in methyl ethyl ketone and dissolved therein, whilst stirring. 150 parts of a 10% strength solution of a copolymer of 66 parts of N-vinylpyrrolidone and 34 parts of vinyl propionate are then added dropwise, with stirring, in the course of 1 hour at 23° C., after which the mixture is stirred for 1 hour. The methyl ethyl ketone is then removed as an azeotropic mixture with water by distilling at a pressure of 90–100 mbar and an internal temperature of 40°–45° C. whilst adding 200 parts of water stepwise. Thereafter, the dispersion obtained is brought to a Ford cup (DIN 4) flow time of 140 s by adding water.

Solids content 63%.

(b) Preparation of a coating:

20 parts of the dispersion are mixed with 0.4 part of methyldiethanolamine and a 100 μm thick layer is applied to a glass plate. The sample is preheated for 10 minutes at 70° C. and is then led past a mercury high pressure lamp (80 W/cm) at a distance of 10 cm, and at a speed of 5 m/min. A very glossy, dry flexible surface-coating film results.

(c) Bonding of a fiber web:

A blended fiber web (wool, nylon and cotton) is impregnated by dipping in the dispersion described under (a), which has been diluted to 50% solids content, and the excess is squeezed off between two rollers. After air-drying, the impregnant is cured by means of a mercury high pressure lamp (80 W/cm). The nonwoven obtained has good mechanical properties.

EXAMPLE 2

(a) Preparation of the dispersion:

84 parts of a 15% strength solution of the dispersant according to Example 1 are added dropwise to a mixture of 126 parts of prepolymer 2 and 42 parts of isopropanol and the resulting dispersion is homogenized by stirring for two hours. The solvent is removed, together with water, by distillation as described in Example 1, whilst adding 190 parts of water stepwise; the dispersion is then brought to a Ford cup (DIN 4) flow time of 130 s by adding water.

Solids content: 44%.

(b) Preparation of a coating:

A 200 μm thick layer of the dispersion is applied to paper and the sample is kept at 70° C. for 5 minutes. It is then cured with an accelerated electron beam, using a radiation dose of 3.04 Mrad. A non-tacky, very glossy and flexible film results.

(c) Bonding of a fiber web:

A blended fiber web is impregnated, as described under 1(c), with the dispersion described under 2(a), and is cured, after air-drying, as described under 2(b).

EXAMPLE 3

(a) Preparation of the dispersion 210 parts of a reaction product of 1 mole of bisphenol A diglycidyl ether with 2 moles of acrylic acid (mean molecular weight 484; viscosity, according to DIN draft 53,788: 480 Pa.s at 23° C.) are successively mixed with 70 parts of methyl ethyl ketone, 140 parts of a 15% strength aqueous solution of the dispersant of Example 1 and 105 parts of a 10% strength aqueous solution of an adduct of 25 moles of ethylene oxide with 1 mole of p-isooctylphenol. After stirring the mixture for two hours at 23° C. the organic solvent is removed together with water, as described in Example 1, whilst adding 140 parts of water stepwise, and the resulting dispersion is then brought to a Ford cup (DIN 4) flow time of 170 s by adding water.

Solids content: 57%.

(b) Preparation of a coating

A 200 μm thick layer of the dispersion is applied to a glass plate and the sample is kept at 80° C. for 10 min. On subsequent curing by means of an accelerated electron beam, using a dose of 3.55 Mrad, a clear, very glossy, hard and scratch-resistant film is obtained.

EXAMPLE 4

(a) Preparation of a pigmented finish

A pigment paste is prepared from 20 parts of prepolymer 2, 2.0 parts of 2-methylthioxanthone, 40 parts of rutile, 6.67 parts of a 30% strength aqueous solution of the dispersant of Example 1 and 146.25 parts of a dispersion, of 55% solids content, prepared as described in Example 2, by shaking this mixture for two hours with porcelain balls.

Solids content: 65%.

(b) Preparation of a coating

An 80 μm thick layer of the pigment paste is applied to leather, kept for 10 minutes at 70° C. and then led past a UV lamp (see Example 1) at a speed of 6 m/min. A very glossy, non-tacky and flexible white coating results.

EXAMPLE 5

(a) Preparation of a pigmented finish 105.7 parts of a 15% strength aqueous solution of the dispersant of Example 1 are added dropwise in the course of 45 minutes to 259 parts of a pigment paste comprising 180 parts of prepolymer 2, 60 parts of isobutanol and 54 parts of copper phthalocyanine; the resulting mixture is stirred for 2.5 hours. The solvent is removed by distillation together with water, whilst adding 200 parts of water stepwise, and the resulting pigmented aqueous dispersion is then diluted with water to a Ford cup (DIN 4) flow time of 184 s.

Solids content: 60%.

(b) Preparation of a coating

A 150 μm thick layer of the dispersion is applied to a glass plate, kept for 10 minutes at 70° and then cured with an electron beam, using a dose of 5.33 Mrad.

A very glossy, hard, blue surface-coating film results.

We claim:

1. A radiation-curable aqueous binder dispersion, which essentially comprises
   (A) from 20 to 80 percent by weight of water,
   (B) from 80 to 20 percent by weight of one or more prepolymers which are dispersed in (A) and contain from 0.01 to 1.0 mole, per 100 g of prepolymer, of polymerizable carbon-carbon double bonds and have a mean molecular weight of not less than 350 and a viscosity, at 23° C., of not less than 600 cp, the sum of the percentages of (A) and (B) being 100, together with
   (C) from 3 to 12 percent by weight, based on (B), of one or more dispersants, selected from the group consisting of polyvinylpyrrolidone and a copolymer of vinylpropionate or vinylacetate with vinylpyrrolidone, and
   (D) from 0 to 20 percent by weight, based on (B), of one or more photoinitiators.

2. The binder dispersion of claim 1, wherein component (B) is a polyester which contains polymerizable carbon-carbon double bonds and has an acid number of at most 10.

3. The binder dispersion of claim 1, wherein component (B) is a polyether which contains polymerizable carbon-carbon double bonds.

4. The binder dispersion of claim 1, wherein component (B) is a hydroxyl-containing reaction product of a polyepoxide, containing two or more epoxide groups per molecule, with one or more $\alpha,\beta$-ethylenically unsaturated carboxylic acids.

5. The binder dispersion of claim 1, wherein component (B) is a polyurethane acrylate or methacrylate which may or may not contain urea groups.

6. The binder dispersion of claim 1, wherein component (B) is a polymer, containing polymerizable double bonds, which is obtained by introducing $\alpha,\beta$-ethylenically unsaturated acyl radicals into an acrylate copolymer.

7. The binder dispersion of claim 1, wherein component (C) is a vinylpyrrolidone/vinyl ester copolymer having a vinyl ester content of less than 35 percent by weight.

* * * * *